(No Model.)
T. R. FISCHER.
STRAINER FOR COFFEE POTS, &c.
No. 523,720. Patented July 31, 1894.
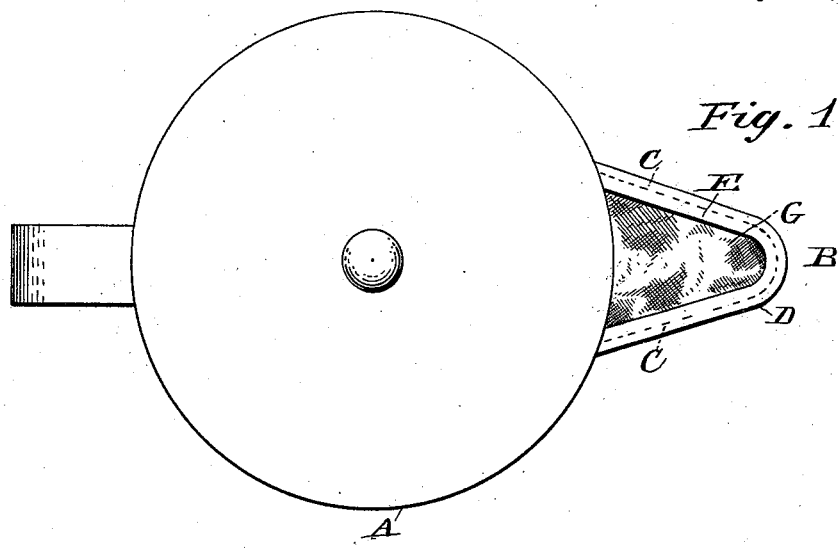
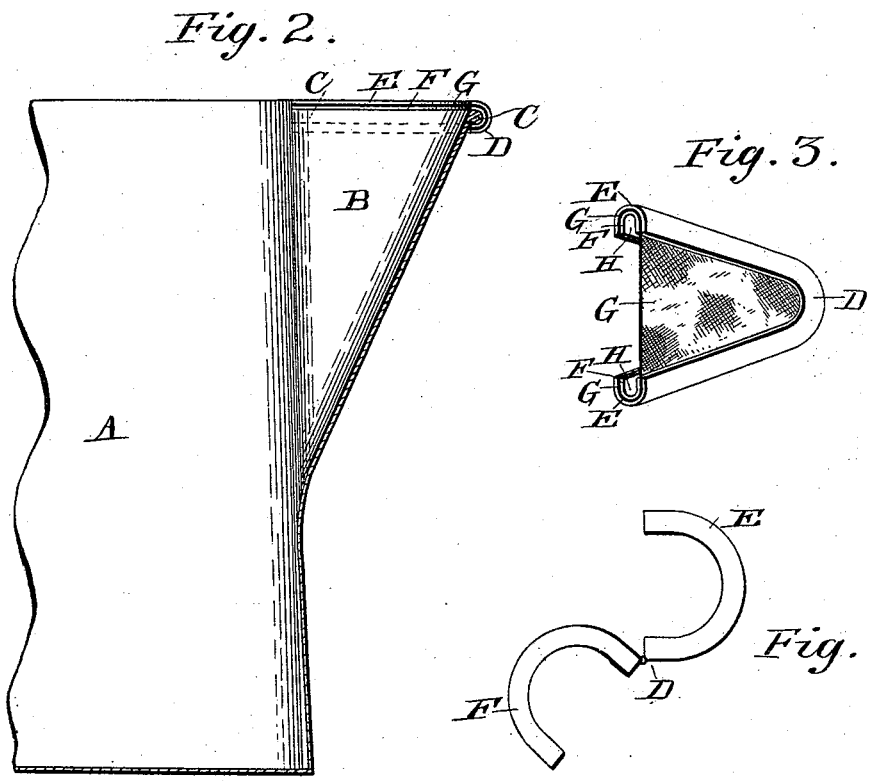
Witnesses
H. P. Doolittle
H. A. Parks
Inventor
Therese R. Fischer
by Blackwood Bros
Attorneys

UNITED STATES PATENT OFFICE.

THERESE R. FISCHER, OF BALTIMORE, MARYLAND.

STRAINER FOR COFFEE-POTS, &c.

SPECIFICATION forming part of Letters Patent No. 523,720, dated July 31, 1894.

Application filed October 21, 1893. Serial No. 488,795. (No model.)

*To all whom it may concern:*

Be it known that I, THERESE R. FISCHER, a citizen of the United States of America, residing at Baltimore, in the State of Maryland, have invented a new and useful Improvement in Strainers for Coffee-Pots, &c.; and I do hereby declare the following to be a full, clear, and exact description of the invention, such as will enable others skilled in the art to which it appertains to make and use the same.

My invention relates to an improvement in strainers for coffee pots, &c.

It has for its object first to provide a removable strainer for the spout of a pot, so that it can be removed either for the purpose of cleaning the spout, or dispensing with it when its service is not required, second to provide a strainer having the cloth or other material through which the liquid is strained removable, so that it can be taken out for the purpose of cleaning it and be replaced again. It will thus be obvious that the strainer can be slipped on or off with facility or that all the parts composing it can be taken apart or put together as the case may require.

My invention consists in a strainer composed of two double U shaped sections of metal or other material, one adapted to fit within the other, and hold a piece of cloth or other material between them and also adapted to slide on the spout of a pot.

Although I have shown the sections forming the strainer separate they may for convenience be hinged together.

My invention is illustrated in the accompanying drawings, in which—

Figure 1, is a plan view of a pot showing my strainer applied; Fig. 2, a longitudinal vertical section of the same; Fig. 3 a perspective view of the strainer removed from the pot, and Fig. 4 a modification showing the sections of the strainer hinged together.

In the drawings, A designates a pot, B, the spout and C a bead on the top thereof.

D, is my strainer which is composed of two double U shaped sections E and F, one fitting within the other.

G, is a piece of cloth or other material through which the liquid to be strained passes and is placed between the sections E and F, and thereby held.

H, is a groove in the strainer into which the bead C slides to retain the strainer in place on the spout of the pot.

The operation is as follows: When it is desired to clean the strainer, it is slid off the spout, the sections forming the same slipped apart and the cloth removed. After all the parts have been cleaned it can be readily put together again by placing the cloth over the smaller one of the sections and sliding the other over it.

Having thus described my invention, what I claim, and desire to secure by Letters Patent, is—

1. A strainer comprising two separable sections, the straining material held between said sections, and the groove to receive the lip projecting from the vessel to which the strainer is to be applied, whereby the strainer is held in place, and the straining material clamped between the sections, substantially as described.

2. A strainer adapted to slide on the lip of a vessel or receptacle comprising two U shaped sections, each made U shaped in cross-section, one fitting within the other, and the straining material held between them, substantially as described.

In testimony whereof I affix my signature in presence of two witnesses.

THERESE R. FISCHER.

Witnesses:
 JACOB W. HOOK,
 LOTTIE FREEMAN.